(No Model.)
R. THAYER.
TRAP FOR DRAIN PIPES.
No. 319,529. Patented June 9, 1885.
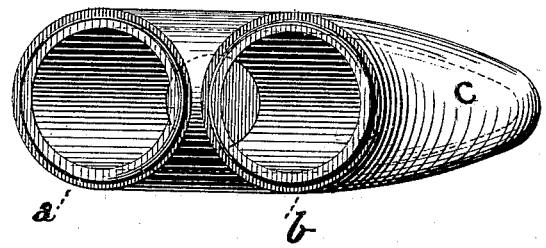
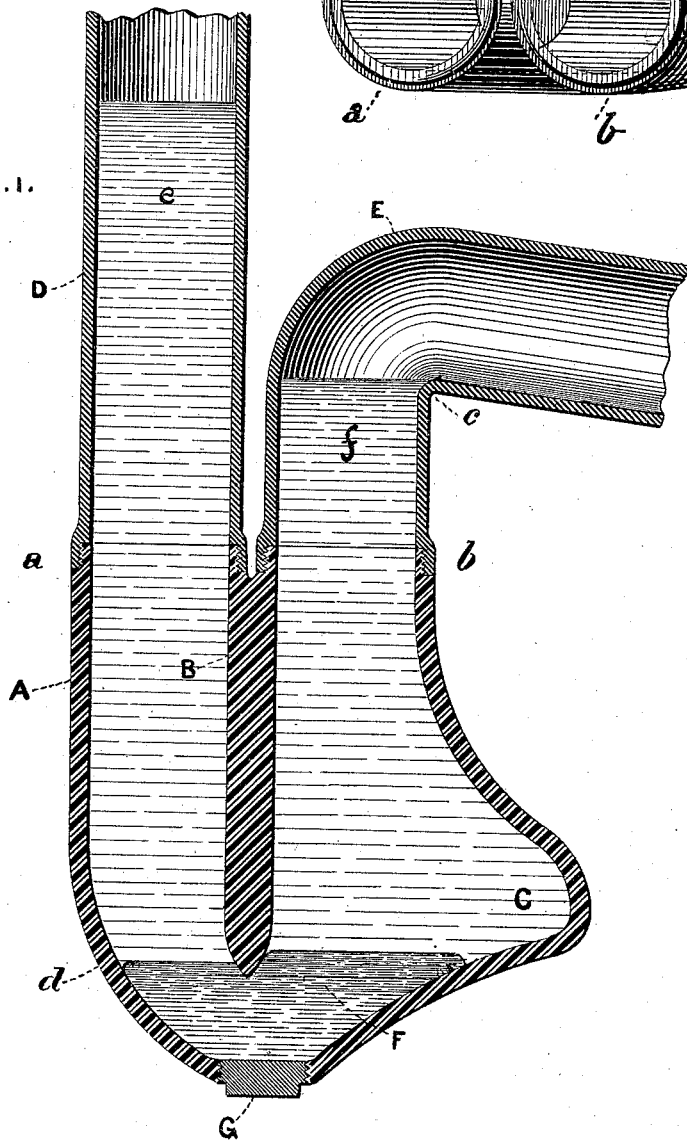
WITNESSES:
Henry M. Paul Jr.
Charles H. Marple.
INVENTOR:
Russell Thayer
By H. C. Fraley
Attorney

UNITED STATES PATENT OFFICE.

RUSSELL THAYER, OF PHILADELPHIA, PENNSYLVANIA, ASSIGNOR TO THE PHILADELPHIA DRAINAGE CONSTRUCTION COMPANY, (LIMITED,) OF SAME PLACE.

TRAP FOR DRAIN-PIPES.

SPECIFICATION forming part of Letters Patent No. 319,529, dated June 9, 1885.

Application filed April 6, 1885. (No model.)

*To all whom it may concern:*

Be it known that I, RUSSELL THAYER, of Philadelphia, in the State of Pennsylvania, have invented a new and useful Improvement in Traps for Drain-Pipes.

The following is a specification of my said improvement, reference being had to the accompanying drawings, in which—

Figure 1 represents a central vertical section through the trap and adjacent pipes, and Fig. 2 a top view of the trap-chamber proper.

The use of mercury as a sealing-fluid in traps is well known, and, being highly desirable, various means have been devised to permit its employment. The most prominent of these devices consists, essentially, of a chamber, through whose bottom the inlet-pipe projects upward, the mercury being disposed around said inlet-pipe, and an inverted cup being placed over the inlet with its rim or edge dipping into the mercury. The inflowing water lifts the cup, and, without actually passing through the mercury, rises to the upper part of the chamber, whence it is discharged by an outlet-pipe. In these, as well as in other forms of mercury-trap at present known, there is the very grave defect that the chamber or other angular receptacle adjacent to the trap affords a lodging-place for filth, so that the trap is liable to be clogged, or to itself become a source of danger from vapors locally generated; and, furthermore, in none of them is the permanent level of the sealing-liquid maintained above the joints of the trap or its connections with the inlet and outlet pipes. The equilibrium of two water-columns resting upon the same body of mercury presents peculiar conditions, and the passage of the water by or through the mercury is attended with certain difficulties, which have doubtless led to the use of these features of construction, in order to avoid what appeared to be obstacles to the employment of simpler forms of trap.

The object of my invention is to make a mercurial trap of the simplest form without angular recesses or chambers in which filth can accumulate, but of such configuration as to be self-cleansing in use, and, furthermore, to permanently maintain the sealing-liquid above all the joints.

In the accompanying drawings, A is the trap chamber, consisting of an oblong vessel of glass or hard rubber, having a curved bottom. A vertical partition, B, extends across from side to side and nearly to the bottom, as shown, thus forming a U-shaped passage. The configuration of the inlet-limb of the passage is such as to make a decided contraction near its bottom, as indicated at $d$, while the outlet-limb is provided with a lateral extension, C, the bottom surface of which is inclined throughout, and whose entire outline is smoothly rounded, so that no corners or angular recesses are presented. A screw-plug, G, may be provided at the bottom to afford access to the interior. At the top of the respective limbs are screw-connections $a\ b$, to which are attached, respectively, the inlet-pipe D and outlet-pipe E. When the joints $a\ b$, but more particularly that of the outlet-pipe, are thus placed at the top of the trap-chamber, the rise of both inlet and discharge pipes to some distance vertically above the joint is necessitated, while, where the outlet-joint is at the side of the trap-chamber, the same result can only be effected by bending the outlet-pipe upward and then again bending it down, a method of construction which is less desirable. The latter rises vertically for a short distance above the joint and is then bent downward at $c$ toward its discharge-point. The inlet-pipe D, however, must rise to a point considerably above the level of overflow-surface of the bend $c$, since when the two water-columns are in equilibrium over mercury, the water on the inlet side of the trap will stand at a much higher level than that on the outlet-side.

F represents the mercury, whose surface is slightly above the lower end of the partition B, the opposite limbs of the mercurial column standing at different levels to balance the unequal water-columns $e\ f$.

The operation of the trap is as follows: a flow of water entering the pipe D, the pressure of the column on that side displaces the mercury. This operation is accomplished the more readily by reason of the contracted channel $d$ and lateral extension C, since a rise in actual level of but a short distance on the outlet side requires a volume of mercury several times as great as the same fall in actual level upon the other side would supply. A displacement of the mercury sufficient to permit the passage of the water around the end of the partition B, is thus effected without requiring so great a height of water-column in D as would otherwise be necessary. When, however, a back-pressure of sewer-gas occurs, the converse of this action takes place, and to displace the mercury in the passage C the mercurial column in $d$ must rise to a very considerable height. This effects a perfect seal with but a very slight dip of the partition B below the mercury, and hence allows the freest possible discharge of the waste-water. The surface of the extension C is of such form that the moving liquid sweeps over it without obstacle, and thus no lodgment of filth can occur. Furthermore, owing to the vertical rise of both inlet and discharge pipes above the joints $a$ and $b$, no escape of gas can take place thereat.

Having thus described my invention, I claim—

In a mercurial trap, the combination, with inlet and outlet pipes which rise to points vertically above the joint with the trap-chamber, of a trap-chamber divided into two limbs by a partition, B, extending nearly to the bottom, the limb upon the inlet side being contracted near its lower end, and the outlet-limb being provided with a lateral extension, C, having an inclined bottom and continuously-curved surface throughout, substantially as and for the purposes set forth.

RUSSELL THAYER.

Witnesses:
 WM. H. MYERS,
 FORREST W. WEST.